United States Patent
Cho

(10) Patent No.: US 6,919,842 B2
(45) Date of Patent: Jul. 19, 2005

(54) HYBRID NAVIGATION SYSTEM USING NEURAL NETWORK

(75) Inventor: Jae-Bum Cho, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/790,307

(22) Filed: Mar. 1, 2004

(65) Prior Publication Data

US 2004/0174297 A1 Sep. 9, 2004

(30) Foreign Application Priority Data

Mar. 6, 2003 (KR) .................................. 10-2003-0014049

(51) Int. Cl.$^7$ .............................................. H04B 7/185
(52) U.S. Cl. ............................. 342/357.06; 342/357.01
(58) Field of Search ........................ 342/357.01, 357.06, 342/450, 442; 701/207, 213

(56) References Cited

U.S. PATENT DOCUMENTS

| | | | | |
|---|---|---|---|---|
| 5,717,406 A | * | 2/1998 | Sanderford et al. | ......... 342/457 |
| 6,084,547 A | * | 7/2000 | Sanderford et al. | ......... 342/457 |
| 6,148,211 A | * | 11/2000 | Reed et al. | ............... 455/456.2 |
| 2004/0075606 A1 | * | 4/2004 | Laiho et al. | ............. 342/357.1 |

\* cited by examiner

*Primary Examiner*—Dao Phan
(74) *Attorney, Agent, or Firm*—F. Chau & Associates, LLC

(57) ABSTRACT

A hybrid navigation system including a neural network is provided. The hybrid navigation system includes a global positioning system (GPS) as a main system using satellites and a radio determination system when there are difficulties in reception of signals from the satellites. The hybrid navigation system comprises a GPS signal processor, a TDOA signal processor and a neural network. The GPS signal processor receives GPS signals from the satellites to determine positions. The TDOA signal processor receives determination signals from mobile communication stations to determine positions. The neural network uses position values inputted from each of the GPS signal processor and the TDOA signal processor to learn and predict the position of the mobile terminal.

20 Claims, 7 Drawing Sheets

HYBRID NAVIGATION SYSTEM USING NEURAL NETWORK

TECHNICAL FIELD

The present invention relates to navigation systems for locating mobile terminals in a mobile communication system; more particularly, a hybrid navigation systems using a neural network.

DISCUSSION OF RELATED ART

A hybrid navigation system is a navigation system having a mixture of a global positioning system (GPS) using satellites and a radio localization system using a mobile communication network.

FIG. 1 shows an arrangement of satellites for a global positioning system (GPS), a component of the hybrid navigation system.

As shown in FIG. 1, each group of four satellites ST is arranged on a circular orbital plane OB. There are six circular orbital planes and each plane has an inclination of 55° with respect to the equatorial plane. In such arrangement, there are twenty-four satellites ST in total, with at least four satellites visible at any location on earth at any instant. With information from at least four satellites, a 3-dimensional position information and clock bias of a mobile terminal can be determined.

The GPS receives radio waves including position information from the satellites. Then, the GPS measures an arrival time of the radio waves at a mobile terminal, and analyzes the position information to determine the position of the mobile terminal in real-time.

A GPS generally utilizes the position information of the satellites, pseudo range, and a Kalman filter as an estimator for locating mobile terminals. A Kalman filter uses a system model comprising a state equation and a measuring equation describing movements of state variables in predicting movements. The Kalman filter estimates a state variable from the measurements. For example, future states are predicted using covariance of the errors between the predicted state variables and the measured values. In other words, the Kalman filter repeatedly performs processes of prediction and correction to minimize the covariance of the errors between the predicted values and the measured values.

A GPS using a Kalman filter can provide fairly accurate position determination even with weak satellite signals. Moreover, a Kalman filter has good signal/noise separation and thus can prevent instantaneous jumps in position. Accordingly, position, velocity, and time can be determined. However, when a mobile terminal is at locations wherein not enough satellites are visible such as in case of a downtown area or indoors, the GPS may have difficulty in determining accurately the position of the mobile terminal, or at least requires a lengthy acquisition time period.

In such circumstance, a hybrid navigation system may be used. For example, a hybrid system having a radio localization system and a mobile communication network. The radio localization system determines the position of the mobile terminal using the arrival time of signals between the stations and the mobile terminal, for example, by using time of arrival (TOA) of signals or by using a time difference of arrival (TDOA). Therefore, at least three or more stations capable of receiving signals generating from the mobile terminal are needed.

FIG. 2 shows a method for determining position using a radio determination system with TDOA. This system determines position of the mobile terminal using TOA of signals from different stations. As illustrated in FIG. 2, the TOA of several signals is measured, which is proportional to the difference in distance between each of the two stations BS1 and BS2 and the mobile terminal MS. The mobile terminal MS is located on the point where the distance difference is constant (R1−R2=constant), that is, on a hyperbola "A" having the position values of the two stations serving as focus. Using the station BS1 and the other station BS3, another hyperbola B is taken in the same manner (i.e., R1−R3=constant). As a result, an intersection point of the two hyperbolas A and B is the position of the mobile terminal MS.

Different from the GPS, the localization signals of the TDOA system used for determining position are less susceptible to interferences of GPS signals in areas such as urban areas or indoors. Recently, a hybrid navigation system 300 such as shown in FIG. 3 has been proposed, including a GPS 302 and a TDOA system 304. The GPS 302 is used as the main navigation system and the TDOA system is used where the signals from satellites are weak or have been interfered with.

The TDOA system is much less accurate than that of the GPS, largely due to a non line of sight (NLOS) and multipath errors. Therefore, even the hybrid navigation system with both the GPS and TDOA system may not satisfy the condition of the E911 standard (i.e., Enhanced 911) prescribed by Federal communication commission (FCC). Enhanced 911 specifies that the probability that errors in tracking of users' positions are less than 100 m is more than 67% in a network based radio determination system and the probability that the errors are less than 50 m is more than 67%.

The errors of the hybrid navigation system may be compensated for by a Kalman filter. However, the position values determined with the GPS or the TDOA system (each one is capable of determining positions independently) includes errors. Kalman filters can be based on a mathematical model having a dynamic equation of a hybrid navigation system and an error model. However, the position values have nonlinear dynamic characteristics, making difficult the deriavation of an accurate mathematical model.

SUMMARY OF THE INVENTION

An improved hybrid navigation system is provided, which comprises a GPS signal processor, a TDOA signal processor and a neural network.

The GPS signal processor receives GPS signals from satellites to detect positions of mobile terminal. The TDOA signal processor receives localization signals from mobile communication stations to determine positions of the mobile terminal. The neural network uses position values inputted from each of the GPS signal processor and the TDOA signal processor to learn and to predict the position of the mobile terminal.

According to an aspect of the invention, a hybrid navigation system comprises: a GPS signal processor for receiving GSP signals from satellites to determine positions of the mobile terminal; a TDOA signal processor for receiving localization signals from stations of the mobile communication system to determine positions of the mobile terminal; and a neural network for learning and predicting the positions of the mobile terminal based on signals received from the GPS signal processor and the TDOA signal processor, wherein the GPS processor is used to determine position of the mobile terminal when four or more GPS satellites are in view.

The neural network corrects weights to learn position information, receiving position values determined with the GPS signal processor, position values determined with the TDOA signal processor and clock bias of a GPS receiver, and the position values determined with the GPS signal processor as a target value, wherein the neural network back propagates position values inputted by the GPS signal processor. Preferably, neural network learns the position values inputted by the GPS signal processor in real time. The target value of the neural network is a position value estimated with a Kalman filter of the GPS signal processor.

The TDOA signal processor predicts positions of the mobile terminal in case that the number of visible satellites is less than four, wherein the neural network receives the position values determined with the TDOA signal processor to predict positions of the mobile terminal by the learning process.

A method of determining positions of a mobile terminal is also provided, comprising: receiving position values determined with the GPS and the TDOA system; learning the determined position information by a neural network in case that the number of the GPS signal is four or more; estimating a present position of the mobile terminal with the GPS; and estimating positions of the mobile terminal with the TDOA system including the learned neural network in case that the number of the received GPS signals is less than four and the total number of the received GPS and TDOA signals is three or more; and initializing the GPS and the TDOA system in case that the total number of the received GPS and TDOA signals is less than three.

Preferably, the case that the number of the TDOA signals is three or more takes priority in the step of estimating the position of the mobile terminal with the TDOA system. The neural network learns by back-propagation.

DESCRIPTION OF PREFERRED EMBODIMENTS

Figure 1:
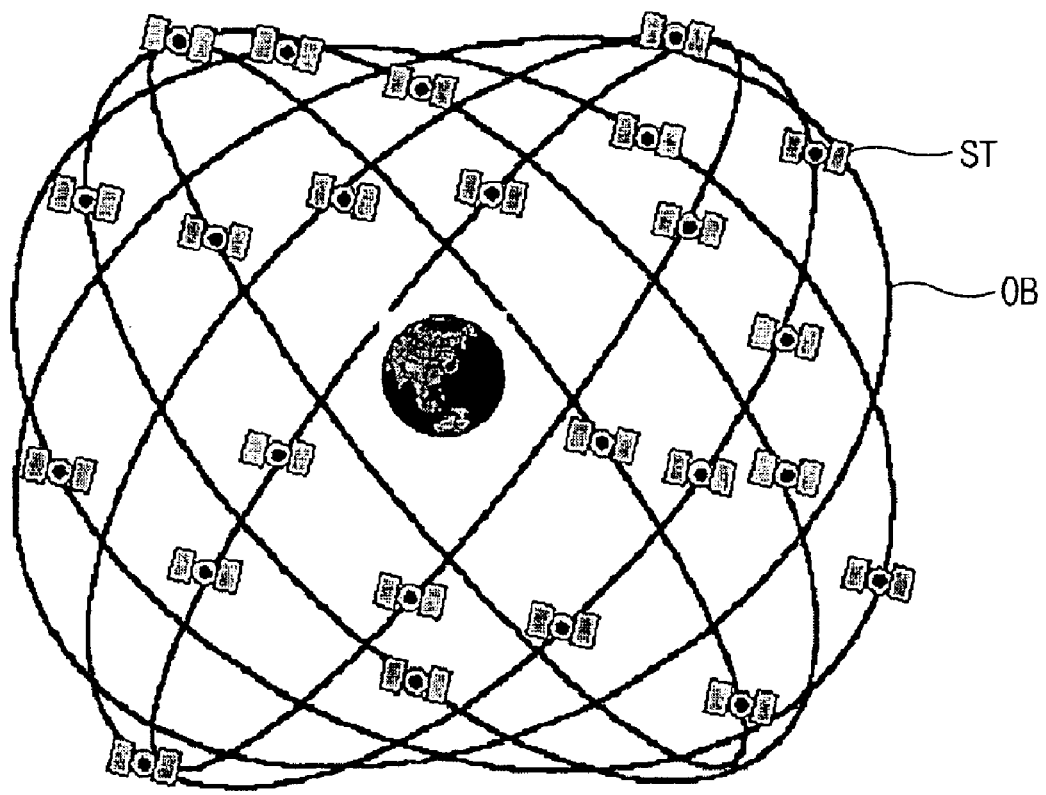
FIG. 1 shows an arrangement of satellites in a global positioning system.
Figure 2:
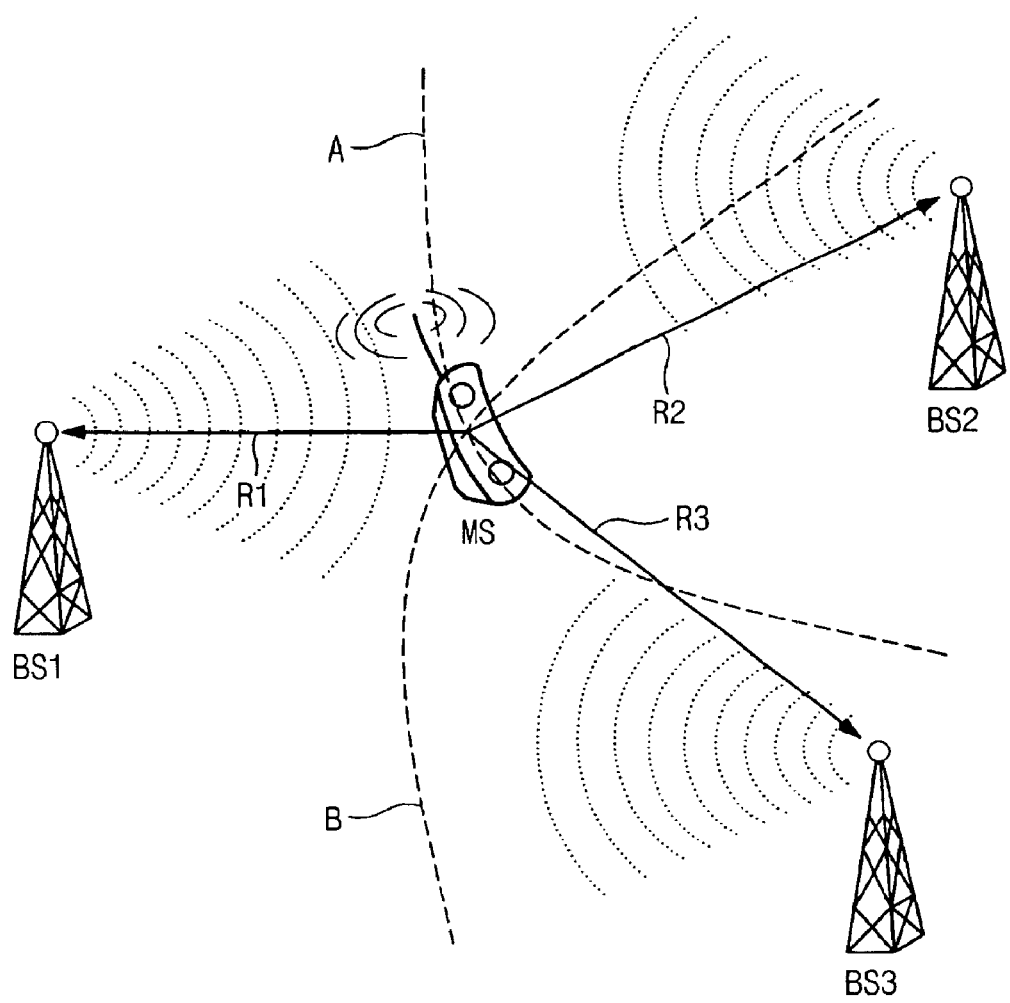
FIG. 2 shows a TDOA system.
Figure 3:
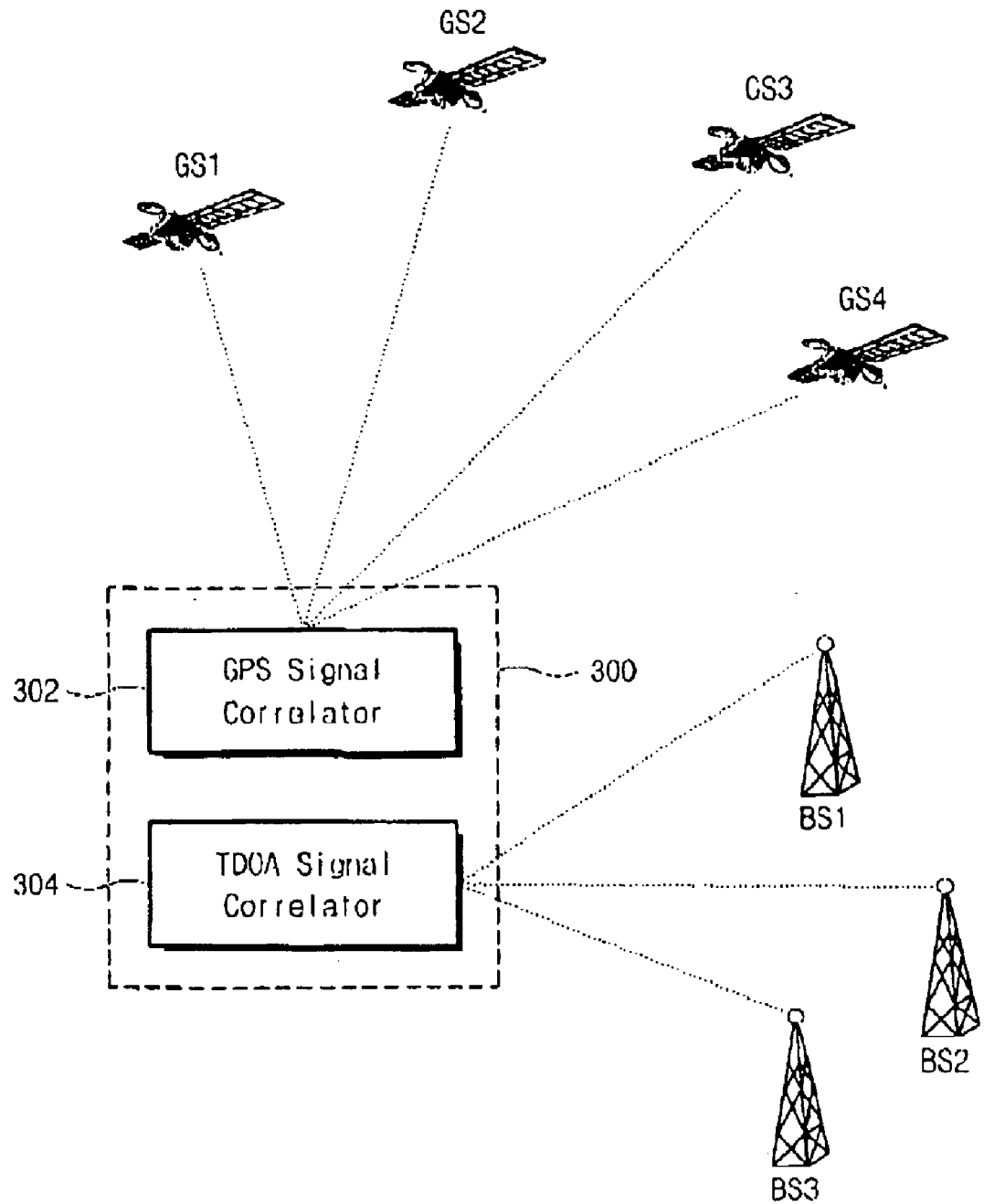
FIG. 3 shows a conventional hybrid navigation system with a GPS system and a TDOA system.
Figure 4:
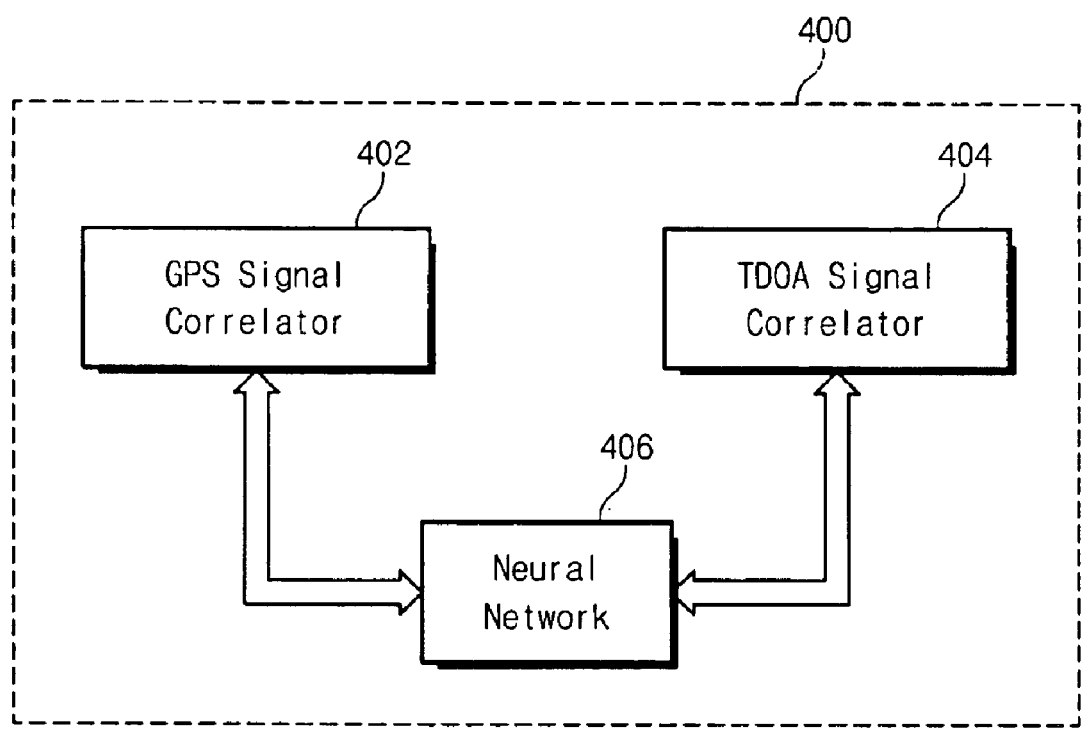
FIG. 4 is a block diagram showing a hybrid navigation system including a neural network according to an embodiment of the present invention.

FIG. 4 is a block diagram showing a hybrid navigation system including a neural network according to an embodiment of the present invention. As shown in FIG. 4, the hybrid navigation system 400 comprises a GPS signal processor 402, a TDOA signal processor 404 and a neural network 406. The GPS signal processor 402 determines position of a mobile terminal by receiving GPS signals from satellites and the TDOA signal processor 404 determines position of a mobile terminal by receiving localization signals from mobile communication stations. The neural network 406 performs learning and prediction functions by using position values from the GPS signal processor 402 and the TDOA signal processor 404.

Preferably, the hybrid navigation system uses the GPS as the main navigation system to determine position, and the neural network learns the position values. If the GPS is unavailable, the hybrid navigation system uses the TDOA system. Then, the TDOA system uses the learned neural network for providing a more accurate position determination. The neural network analyzes problems using a learning process and controlling correlation between neurons to derive mathematical models (A neuron is a minimum unit composing a neural network). This process is similar to what a human does in learning and memorizing and performing the functions such as reasoning, classification, prediction, etc. The neural network is widely used in optimization and prediction and can be applied in various tasks for example, signal processing, voice recognition, robotics, navigation system, etc. In the neural network, probability of occurrence or statistics using past data is used to predict system operations.

Figure 5:
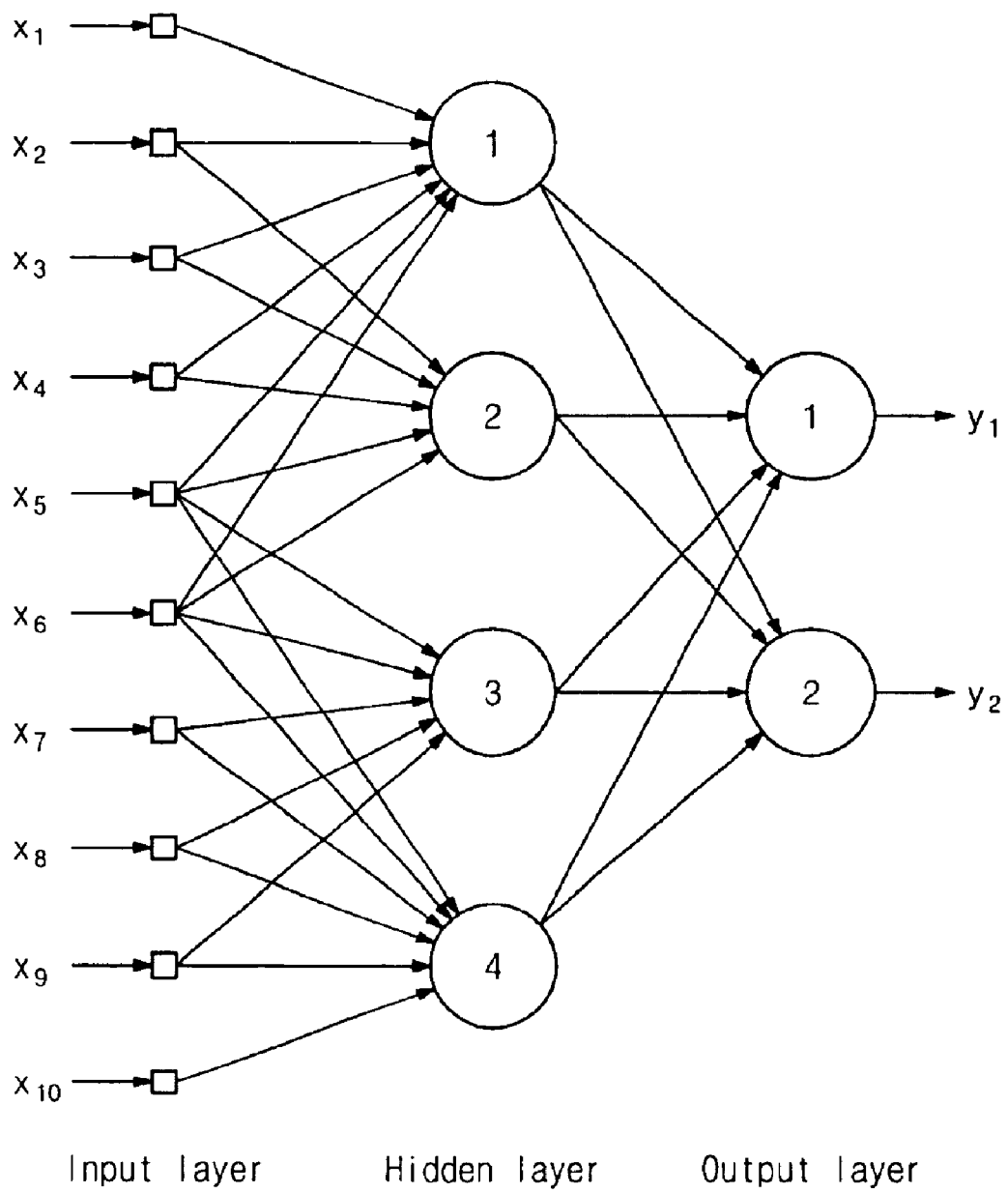
FIG. 5 shows an algorithm of the neural network.

FIG. 5 shows a conventional neural network including a hidden layer. As shown in FIG. 5, the neural network comprises an input layer, a hidden layer and an output layer. The number of hidden layers and processing units of the neural network are not determined by specific rules but determined experimentally by trial and error. Generally, predictions are more accurate as the number of the hidden layers and the processing units is larger (i.e., as a degree of freedom of the neural network is larger), but the time needed for the neural network to learn becomes longer.

According to an embodiment of the present invention, the hybrid navigation system learns position information using a back propagation algorithm. An examplary back propagation algorithm is now described. First, weights of the neural network are initialized and then the position values introduced into an input layer are propagated through a hidden layer and an output layer. Next, target values set in the output layer are compared to the propagated output values to calculate errors of the output layer and errors of the hidden layer. Then, the weight of each layer is corrected considering the calculated errors. The process is repeated until there are no errors between the output values propagated by the neural network and the real target values.

Figure 6:
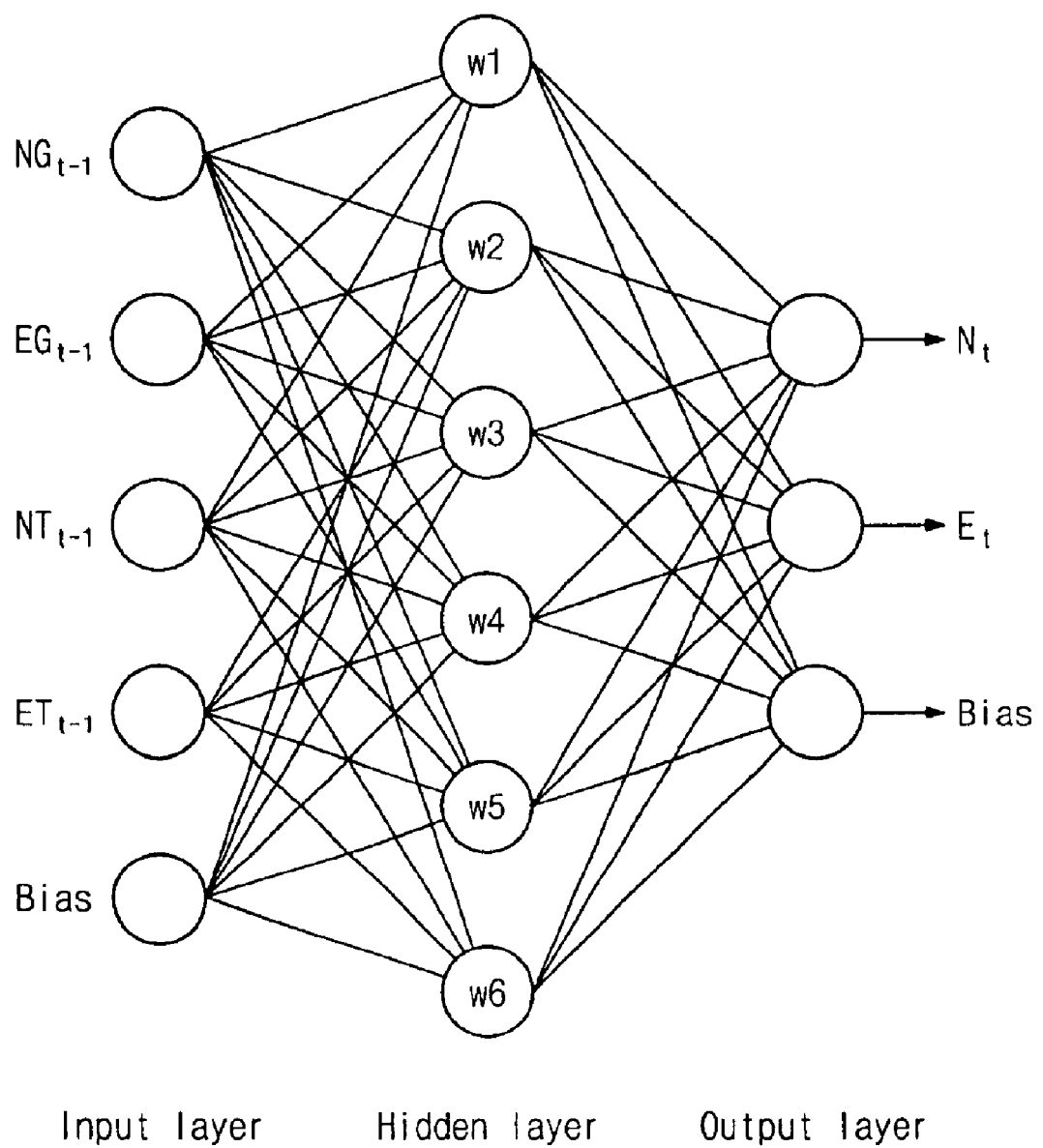
FIG. 6 shows a neural network including five inputs, one hidden layer and three outputs according to an embodiment of the present invention.

FIG. 6 is a diagram showing a preferred neural network according to the present invention. As shown in FIG. 6, the neural network comprises five inputs, one hidden layer and three outputs. The hidden layer comprises six processing units. The neural network estimates present position values via a propagation process, receiving GPS position values ($NG_{t-1}$, $EG_t 1$) and position values of the TDOA system ($NT_{t-1}$, $ET_{t-1}$), with respect to the positions at prior time, and clock bias values of a mobile terminal. Then, estimated present position values (Nt, Et) are compared to target values achieved with a Kalman filter of the GPS (i.e., position values determined by the GPS) to reach errors. Therefore, the errors are corrected by the reverse propagation algorithm to learn the neural network. In this case, the $NG_{t-1}$, and $EG_t 1$ are coordinate values of the position determined at the prior time t-1 by the GPS in an NE coordinate system, and the $NT_{t-1}$ and $ET_{t-1}$ are coordinate values of the position determined by the TDOA system. The $N_t$ and $E_t$ are coordinate values of the present position that are estimated by the neural network.

When the GPS signals are weak, the position values determined by the TDOA system are used as inputs to carry out the propagation.

Figure 7:
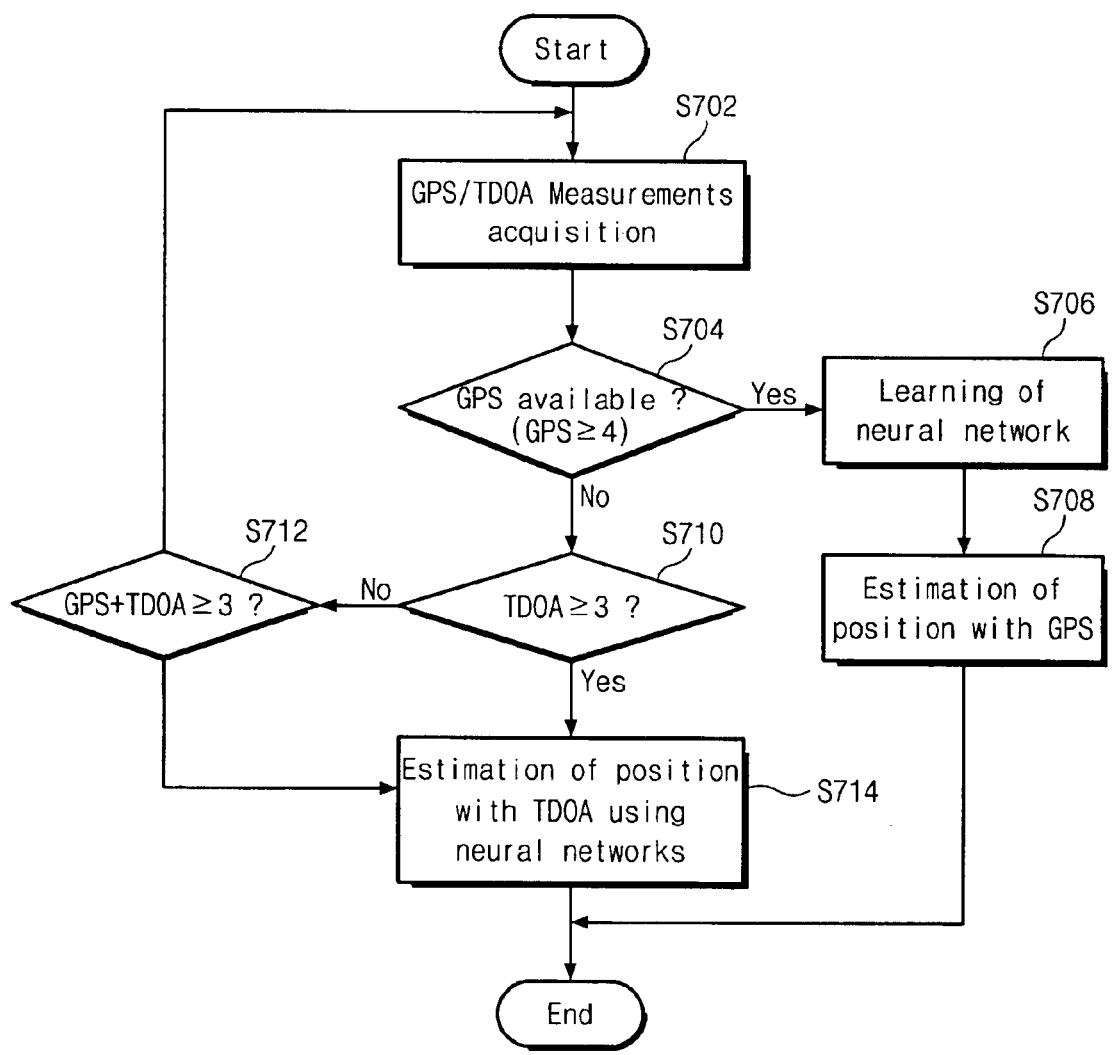
FIG. 7 is an exemplary flow chart of a hybrid navigation system process including the neural network.

FIG. 7 is a flow chart showing a process of a hybrid navigation system. When a mobile terminal including a GPS is initially driven, the GPS is initialized together with a Kalman filter therein. In addition, positions of the GPS satellite and pseudo ranges are obtained by sensing and tracking GPS signals, and TDOA signals are sensed (in a step S702). Then, it is decoded whether position can be determined with GPS or not (in a step S704). If the GPS is available for use, for example, the number of receiving GPS signals is four or more, outputs of the Kalman filter driving the GPS are set to target values of the neural network (in a step S706). Then, the position of the mobile terminal is determined with GPS (in a step S708).

However, if the number of receivable GPS satellites in view is less than four (step S704), the position of mobile terminal cannot be determined with the GPS. In such case, the TDOA system is utilized to determine the position of the mobile terminal. Illustrative steps can be: first, it is judged whether the number of the TDOA signals is three or more (in a step S710); if the number of receivable TDOA signals is three or more, the TDOA system starts to measure positions of mobile terminal, and the learned neural network uses the measured position values to determine final position values (in a step S714).

When the number of receivable TDOA signals is not three or more (in step S714), the total number of the received GPS signals and TDOA signals is judged (in a step S712). If the total number of receiving signals is three or more, the position of the mobile terminal is determined with the TDOA system using the learned neural network (step S714). If the total number of signals received in the step S712 is less than three, the GPS and TDOA systems are initialized and the position of the mobile terminal is predicted with only the previous resultant values by the neural network.

According to embodiments of the present invention, the hybrid navigation system can mutually compensate for disadvantages of the GPS and TDOA system by way of a learning process of a neural network without building mathematical model with respect to nonlinear position values. As a result, the position of mobile terminal can be acquired accurately.

What is claimed is:

1. A hybrid navigation system comprising:
    a GPS signal processor for receiving (GPS) signals from satellites to determine positions of the mobile terminal;
    a TDOA signal processor for receiving localization signals from stations of the mobile communication system to determine positions of the mobile terminal; and
    a neural network for learning and predicting the positions of the mobile terminal based on a selective use of signals received from the GPS signal processor when a predetermined number of satellite are in view and the TDOA signal processor.

2. The hybrid navigation system of claim 1, wherein the neural network uses the input from the GPS processor to determine position of the mobile terminal when four or more GPS satellites are in view.

3. The hybrid navigation system of claim 1, wherein the neural network corrects weights to learn position information, receiving position values determined with the GPS signal processor, position values determined with the TDOA signal processor and clock bias of a GPS receiver, and the position values determined with the GPS signal processor as a target value.

4. The hybrid navigation system of claim 3, wherein the neural network back propagates position values inputted by the GPS signal processor.

5. The hybrid navigation system of claim 3, wherein the neural network learns the position values inputted by the GPS signal processor in real time.

6. The hybrid navigation system of claim 3, wherein the target value of the neural network is a position value estimated with a Kalman filter of the GPS signal processor.

7. The hybrid navigation system of claim 1, wherein the TDOA signal processor predicts positions of the mobile terminal in case that the number of visible satellites is less than four.

8. The hybrid navigation system of claim 1, wherein the neural network receives the position values determined with the TDOA signal processor to predict positions of the mobile terminal by the learning process.

9. A method of determining positions of a mobile terminal, comprising:
    receiving position values determined with the GPS and the TDOA system;
    learning the determined position information by a neural network in case that the number of the GPS signal is four or more;
    estimating a present position of the mobile terminal with the GPS; and
    estimating positions of the mobile terminal with the TDOA system including the learned neural network in case that the number of the received GPS signals is less than four and the total number of the received GPS and TDOA signals is three or more; and
    initializing the GPS and the TDOA system in case at the total number of the received GPS and TDOA signals is less than three.

10. The method of claim 9, wherein the case that the number of the TDOA signals is three or more takes priority in the step of estimating the position of the mobile terminal with the TDOA system.

11. The method of claim 9, wherein the neural network learns by back-propagation.

12. The method of claim 9, wherein the position with the GPS becomes the target value during the learning of the neural network.

13. A hybrid navigation system comprising:
    a GPS signal processor for receiving GPS signal from GPS satellites to determine positions of the mobile terminal;
    a TDOA signal processor for receiving localization signals from stations of the mobile communication system to determine positions of the mobile terminal; and
    a neural network for learning and predicting the positions of the mobile terminal based on signals received from the TDOA signal processor when GPS signals for positioning the mobile terminal are available from less than four GPS satellites, wherein the weights are assigned to each layer of the neural network.

14. The hybrid navigation system of claim 13, wherein the neural network uses the input from the GPS processor to determine position of the mobile terminal when four or more GPS satellites are in view.

15. The hybrid navigation system of claim 14, wherein the neural network corrects weights to learn position information, receiving position values determined with the GPS signal processor, position values determined with the TDOA signal processor and clock bias of a GPS receiver, and the position values determined with the GPS signal processor as a target value.

16. The hybrid navigation system of claim 15, wherein the neural network back propagates position values inputted by the GPS signal processor.

17. The hybrid navigation system of claim 15, wherein the neural network learns the position values inputted by the GPS signal processor in real time.

18. The hybrid navigation system of claim 15, wherein the target value of the neural network is a position value estimated with a Kalman filter of the GPS signal processor.

19. The hybrid navigation system of claim 13, wherein the TDOA signal processor predicts positions of the mobile terminal in case that the number of visible satellites is less than four.

20. The hybrid navigation system of claim 13, wherein the neural network receives the position values determined with the TDOA signal processor to predict positions of the mobile terminal by the learning process.

* * * * *